(12) United States Patent
Bastow-Cox et al.

(10) Patent No.: US 12,084,730 B2
(45) Date of Patent: Sep. 10, 2024

(54) METHODS AND SYSTEMS FOR INCREASING THE CARBON CONTENT OF DIRECT REDUCED IRON IN A REDUCTION FURNACE

(71) Applicant: Midrex Technologies, Inc., Charlotte, NC (US)

(72) Inventors: Keith Marshall Bastow-Cox, Charlotte, NC (US); Todd Michael Astoria, Harrisburg, NC (US); Gregory Darel Hughes, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 135 days.

(21) Appl. No.: 17/209,506

(22) Filed: Mar. 23, 2021

(65) Prior Publication Data
US 2021/0301358 A1   Sep. 30, 2021

Related U.S. Application Data
(60) Provisional application No. 62/993,771, filed on Mar. 24, 2020.

(51) Int. Cl.
   C21B 13/00   (2006.01)
   C21B 13/02   (2006.01)
(52) U.S. Cl.
   CPC .......... *C21B 13/0073* (2013.01); *C21B 13/02* (2013.01)
(58) Field of Classification Search
   CPC ....... C21B 13/0073; C21B 13/02; F27B 1/00; F27B 1/16; F27B 1/005; F27B 1/10; Y02P 10/134; F27D 3/16; F27D 7/02

USPC .................................... 75/495, 496; 122/6.6
   See application file for complete search history.

(56) References Cited

U.S. PATENT DOCUMENTS

| | | | |
|---|---|---|---|
| 4,054,444 A | 10/1977 | Clark et al. | |
| 4,118,017 A | 10/1978 | Hendrickson | |
| 4,150,972 A | 4/1979 | Price-Falcon | |
| 4,160,663 A | 7/1979 | Hsieh | |
| 4,224,057 A | 9/1980 | Martinez-Vera et al. | |
| 4,584,016 A | 4/1986 | Becerra-Novoa et al. | |
| 4,702,766 A | 10/1987 | Love et al. | |
| 4,734,128 A | 3/1988 | Becerra-Novoa et al. | |

(Continued)

FOREIGN PATENT DOCUMENTS

DE 19538591 C1 4/1997
EP 0179734 A2 4/1986

(Continued)

OTHER PUBLICATIONS

WO-2011122535-A1 Translation (Year: 2011).*

(Continued)

*Primary Examiner* — Brian D Walck
*Assistant Examiner* — Danielle Carda
(74) *Attorney, Agent, or Firm* — Clements Bernard Walker; Christopher L. Bernard (57) ABSTRACT

A method for producing direct reduced iron having increased carbon content, comprises delivering each of the herein-described mixed carburizing gas streams, which are of different composition, to a transition zone of a direct reduction furnace, and exposing partially or completely reduced iron oxide to the mixed carburizing gas streams to increase the carbon content of resulting direct reduced iron to greater than 4.5 wt. %.

8 Claims, 4 Drawing Sheets

(56) References Cited

U.S. PATENT DOCUMENTS

| | | |
|---|---|---|
| 4,752,329 A | 6/1988 | Freeland et al. |
| 4,854,967 A | 8/1989 | Hauk |
| 5,618,032 A | 4/1997 | Meissner |
| 5,840,097 A | 11/1998 | Dam |
| 6,048,382 A | 4/2000 | Greenwalt |
| 6,506,230 B2 | 1/2003 | Montague |
| 6,511,629 B1 | 1/2003 | Kepplinger et al. |
| 7,931,731 B2 | 4/2011 | Van Heeringen |
| 9,868,999 B2 | 1/2018 | Cheeley |
| 10,508,314 B2 | 12/2019 | Motamedhashemi |
| 2002/0050097 A1 | 5/2002 | Fournier et al. |
| 2006/0174941 A1 | 8/2006 | Cohen et al. |
| 2009/0193846 A1 | 8/2009 | Foral |
| 2009/0293539 A1 | 12/2009 | Briglia |
| 2012/0125157 A1 | 5/2012 | Duarte-escareño et al. |
| 2017/0009309 A1 * | 1/2017 | Motamedhashemi . B01D 53/62 |
| 2018/0119237 A1 | 5/2018 | Voelker et al. |

FOREIGN PATENT DOCUMENTS

| | | | |
|---|---|---|---|
| EP | 1930448 A2 | 6/2008 | |
| EP | 1991711 A1 | 11/2008 | |
| JP | 2018172650 A * | 11/2018 | |
| WO | 0036159 A1 | 6/2000 | |
| WO | 2001018257 A1 | 3/2001 | |
| WO | WO-2011122535 A1 * | 10/2011 | ............. C10B 49/04 |
| WO | 2018057025 A1 | 3/2018 | |

OTHER PUBLICATIONS

JP-2018172650-A Translation (Year: 2018).*

Aug. 10, 2021 International Search Report issued in corresponding International Application No. PCT/US21/23801.

European Search Report issued in corresponding EP Application No. 21775945.

* cited by examiner

METHODS AND SYSTEMS FOR INCREASING THE CARBON CONTENT OF DIRECT REDUCED IRON IN A REDUCTION FURNACE

CROSS-REFERENCE TO RELATED APPLICATION

The present invention claims the benefit of priority of U.S. Provisional Patent Application No. 62/993,771, filed on Mar. 24, 2020, and entitled "MIDREX PROCESS UTILIZING EXTENDED ADJUSTABLE CARBON TECHNOLOGY," the contents of which are incorporated in full by reference herein.

TECHNICAL FIELD

The present invention relates generally to the direct reduced iron (DRI) and steelmaking fields. More specifically, the present disclosure relates to methods and systems for increasing the carbon content of DRI in a direct reduction (DR) facility, and especially to direct reduction (DR) methods and systems capable of producing carbon in the DRI in excess of about 4.5 wt. %.

BACKGROUND

Direct reduced iron (DRI), which is often referred to as sponge iron, is typically produced by the reaction of iron ore in a reactive gas stream containing reducing agents, such as $H_2$ and CO, in a moving bed or vertical shaft reactor. Such DRI product can be used as a source of low-residual iron, in addition to ferrous scrap and pig iron in the production of steel, mainly through an electric arc furnace (EAF) in a steelmaking facility. The EAF melts the charged material with use of an electric arc, typically accompanied by the injection of oxygen in order to burn impurity carbon and $Fe_3C$, if any. The partial or complete combustion of the carbon with oxygen provides a uniform internal source of energy for the EAF when the oxygen is injected into the EAF. Furthermore, the conversion of $Fe_3C$ into iron and carbon is an exothermic reaction, which improves the thermal efficiency of the EAF. Therefore, the carbon content of the DRI can be interpreted as an energy source, and this energy is finally utilized in the EAF when the DRI is melted.

Current Electric Arc Furnace (EAF) technology relies on scrap metal or direct reduced (DR) grade ore supply to minimize yield losses to the slag. With potential ore supply degradation, DR grade ore may be limited in the future. The state-of-the-art EAF produces steel which has low carbon contents, typically less than 0.35 wt. % in carbon steel. This means that some DR plants do not have to produce high carbon. If lower grade iron sources are used, then the increased slag volume leads to higher loss of the iron to the slag, which can adversely impact the overall economics and efficiency of the process. In the future, it may be necessary to limit the iron loss to the slag by changing the process conditions in the melter. One way to achieve this is by having a higher reducing environment in the melter by adding more carbon to the DRI. Modern day steelmakers are constantly looking for high carbon iron units like pig iron or hot metal from a blast furnace to provide the carbon they desire to offset their electrical energy consumption. The carbon in the iron feedstock to the melter can be converted using oxygen blowing practices in steelmaking to release thermal energy in the melting step. This energy release forms CO and some $CO_2$. By controlling the oxygen blowing, the steelmaker can control the $CO/CO_2$ ratio in the atmosphere above the molten bath to keep it reducing to iron. The steelmaker utilizes this energy and chemistry in the melter to reduce the electrical input needed to melt iron with no carbon, such as is the case with steel scrap. Melters melting steel scrap need carbon units to maintain the reducing atmosphere in the melter and provide additional energy for melting. High carbon iron units are the most desirable as they provide the greatest carbon benefit per unit of high carbon iron material. It allows the EAF steelmaker to maximize the use of steel scrap in the melter charge material. With this growing demand for higher and higher carbon iron units by steelmakers, there is a need to achieve greater carbon in the DRI from a DR plant.

Carbon may be added to DRI within the DR Process through one, or a combination of, carburizing reactions within a countercurrent DR reactor. The carburizing reactions that can be utilized within the DR Process are:

| | | |
|---|---|---|
| (1) | $2CO \Leftrightarrow CO_2 + C(s)$ | Boudouard Reaction |
| (2) | $CO + H_2 \Leftrightarrow H_2O + C(s)$ | Water-Carbon Reaction |
| (3) | $C_nH_{2n+2} \Leftrightarrow n + 1\, H_2 + nC(s)$ | Hydrocarbon Cracking | and each of these carburizing reactions is catalyzed in the presence of metallic iron. In each of the carburizing reactions, (1)-(3), the resulting form of the carbon can be graphitic carbon as shown in these equations or cementite, $Fe_3C$. Both forms of carbon are present in the DRI product from a DR reactor.

As detailed in the prior U.S. Pat. No. 10,508,314 also assigned to Midrex Technologies, Inc. and entitled METHODS AND SYSTEMS FOR INCREASING THE CARBON CONTENT OF SPONGE IRON IN A REDUCTION FURNACE, the contents of which are hereby incorporated by reference, a current practice of adding carbon to the DRI within a reduction reactor is the cracking of hydrocarbons via reaction (3) within a zone in the reactor called the transition zone. This zone is located just below the bustle area where the main reducing gas flow is introduced and extends downward to the top of the discharge or cooling zone of the DR reactor. The system put forth in the aforementioned patent is to make the transition zone more carburizing by the addition of a CO-rich gas to be mixed with the hydrocarbon gas, typically natural gas, resulting in a single mixed gas stream entering the transition zone to create a more carburizing and less endothermic reaction environment thereby increasing the carbon content in the DRI while preserving the thermal energy within the descending reactor burden.

The transition zone in a Cold Discharge Direct Reduced Iron, CDRI plant has a great deal of carburizing potential due to the large amount of thermal energy stored in the DRI that must be removed before the DRI can be discharged to atmosphere. In a CDRI plant there is 130-140 kcal/kg of DRI energy to be removed before discharge. A large portion of this energy can be used to fuel the cracking reactions often used to carburize the DRI via the injection of natural gas into the transition zone.

In a Hot Discharge Direct Reduced Iron, HDRI or Hot Briquetted Iron, HBI plant the minimum temperature that must be maintained in the hot product to support downstream processing is significantly larger than that in a CDRI plant. These significantly higher discharge temperature requirements reduce the available heat in the transition zone that can be used to support carburization down to the range of about 13.5-18.5 kcal/kg of DRI. This is an almost tenfold reduction in energy from that in a CDRI plant. This is a significant reason why carbon contents from HDRI and HBI plants run much lower than CDRI plants, yet the demand from steelmakers is to produce higher carbon products to support the downstream steelmaking operation more efficiently.

Accordingly, while prior teachings may provide for increasing the carbon content within the DRI up to 3.5 wt. %, limitations are present, e.g., thermal and equilibrium limitations. To reach higher carbon levels approaching and even exceeding about 4.5 wt. %, which is a significant advantage, new methods and systems are needed. Thus, what is still needed in the art, however, are Direct reduction (DR) methods and systems capable of producing carbon in the DRI in excess of about 4.5 wt. %.

BRIEF SUMMARY OF THE INVENTION

Embodiments of the present invention improve upon prior methods and practices of carburizing DRI, especially in HDRI or HBI plants. The challenges as put forth previously are focused on the adequate use of the heat available within the transition zone, which is a nearly adiabatic system. Only the heat losses through the walls of the shaft furnace keep it from being entirely adiabatic and these heat losses are relatively insignificant as they fall into the <1% range of the thermal energy in the transition zone.

This previous practice, while beneficial, may only go so far in the optimization and utilization of the carburizing potential within the transition zone. Embodiments of the present invention advantageously provide for even more carburizing potential by increasing the potential gas flows that can be handled within the transition zone, as well as increasing both gas-to-solid contact area at more elevated temperature and the gas chemistry profile for enhanced DRI carburization.

Thus, according to embodiments, direct reduction (DR) methods and systems are herein provided which are advantageously capable of producing carbon in the DRI in excess of about 4.5 wt. %.

According to embodiments, the present invention provides a method for producing direct reduced iron having increased carbon content. The method comprises: providing a carbon monoxide-rich gas stream, and separating the carbon monoxide-rich gas stream into at least two separate carbon monoxide-rich gas streams; providing a hydrocarbon-rich gas stream and separating the hydrocarbon-rich gas stream into at least two separate hydrocarbon-rich gas streams; blending one of the carbon monoxide-rich gas streams with one of the hydrocarbon-rich gas streams to form a mixed carburizing gas stream; blending another carbon monoxide-rich gas stream of the at least two separate carbon monoxide-rich gas streams with another hydrocarbon-rich gas stream of the at least two separate hydrocarbon-rich gas streams to form a distinct mixed carburizing gas stream; delivering each of the mixed carburizing gas streams, which are of different composition, to a transition zone of a direct reduction furnace, and exposing partially or completely reduced iron oxide to the mixed carburizing gas streams to increase the carbon content of resulting direct reduced iron to greater than about 4.5 wt. %. The method can further comprise: separating the carbon monoxide-rich gas stream into a first carbon monoxide-rich gas stream, a second carbon monoxide-rich gas stream and a third carbon monoxide-rich gas stream; separating the hydrocarbon-rich gas stream into a first hydrocarbon-rich gas stream, a second hydrocarbon-rich gas stream and a third hydrocarbon-rich gas stream; blending the first carbon monoxide-rich gas stream with the first hydrocarbon-rich gas stream in a first mixer to form a first mixed carburizing gas stream; blending the second carbon monoxide-rich gas stream with the second hydrocarbon-rich gas stream in a second mixer to form a second mixed carburizing gas stream; blending the third carbon monoxide-rich gas stream with the third hydrocarbon-rich gas stream in a third mixer to form a third mixed carburizing gas stream; delivering each of the first, second and third mixed carburizing gas streams, which have different compositions, to a transition zone of a direct reduction furnace, and exposing partially or completely reduced iron oxide to the first mixed carburizing gas stream, the second mixed carburizing gas stream and the third mixed carburizing gas stream to increase the carbon content of resulting direct reduced iron to greater than about 4.5 wt. %. The providing of the carbon monoxide-rich gas stream can comprise initially providing one of a reformed gas stream from a reformer, and the carbon monoxide-rich gas stream is directed from a carbon monoxide recovery unit that forms a portion of the carbon monoxide-rich gas stream and a $H_2$-rich effluent gas stream. The transition zone can comprise a plurality of tiers of equal height within the transition zone and each tier comprises an arrangement of nozzles, and wherein each of the mixed carburizing gas streams is introduced into a separate tier of the transition zone via the arrangement of nozzles at each tier. The nozzles introducing the mixed carburizing gas stream at each tier can be placed in a circumferential ring of equal number of nozzles located at the bottom of each tier. The circumferential ring can comprise between about 16 to 28 nozzles. The nozzles can be individually-valved or header-valved with no more than 4 nozzles per header. The nozzles can be turned off or on and coordinated as to maximize contact area with the hottest DRI. Each of the mixed carburizing gas streams can be introduced into a separate tier of the transition zone in varied composition for each tier using a separate mixer for each tier. Each of the mixed carburizing gas streams can be preheated to different temperatures for each tier using a separate preheater. Preheat temperatures can range from ambient to 400° C. Each of the mixed carburizing gas streams can be of different composition. The transition zone can comprise a plurality of tiers stacked vertically and each of the mixed carburizing gas streams is introduced into a separate tier. The transition zone, which typically ranges from 1.0 m-3.0 m in height will be increased more than 0.5 m in total height, e.g., to a height between from 1.5 m-3.5 m, to allow sufficient volume for effective implementation of the tier arrangement.

Also according to embodiments, a direct reduced shaft furnace comprises: a reduction zone; a transition zone, wherein the transition zone has multiple vertically stacked tiers, and each tier is configured to receive a separate flow of a mixed carburized gas stream; and a cooling zone located below the transition zone, wherein reduced iron is partially or completely exposed to the mixed carburizing gas streams to increase the carbon content of resulting direct reduced iron to greater than about 4.5 wt. %. The transition zone can comprise a plurality of tiers of equal height within the transition zone and each tier comprises an arrangement of nozzles, and wherein the furnace is configured to receive each of the mixed carburizing gas streams in a separate tier of the transition zone via the arrangement of nozzles at each tier. The nozzles at each tier can be configured in a circumferential ring of equal number of nozzles located at the bottom of each tier. The circumferential ring can comprise between about 16 to 28 nozzles. The nozzles can be individually-valved or header-valved with no more than 4 nozzles per header. The furnace can be configured to receive each of the mixed carburizing gas streams introduced into a separate tier of the transition zone in varied composition. Each tier can comprise a different composition, and the transition zone, which typically ranges from 1.0 m-3.0 m in height will be increased more than 0.5 m in total height, e.g., to a height between 1.5 m-3.5 m, to allow sufficient volume for effective implementation of the tier arrangement.

BRIEF DESCRIPTION OF THE DRAWINGS

The present invention is illustrated and described herein with reference to the various drawings, in which like reference numbers are used to denote like system/assembly components/method steps, as appropriate, and in which.

DETAILED DESCRIPTION OF THE INVENTION

Embodiments of the invention advantageously improve upon prior methods and systems for increasing the carbon content of direct reduced iron (DRI). For example, in some prior techniques, with a single circumferential injection system located at the bottom of a transition zone where all of the carburizing gas mixture is introduced, the carburizing gas passes rapidly from the outer walls of the reactor and combines to create a single column of upflowing gas in the center of the reactor. This geometry/process which is disclosed in the afore-referenced teaching of U.S. Pat. No. 10,508,314 and now also often referred to as Adjustable Carbon Technology, ACT, while beneficial may be improved upon, especially regarding the reaction system as the gas has limited heat transfer contact area and metallic carburizing surface area. A practice in transition zone injection is the introduction of hydrocarbon gas through a minimum number (~8) of nozzles grouped in pairs, located 90° apart. These nozzles supply gas that actually contacts a very small portion of the total area of the zone. This may result in some localized over cooling which may inhibit the kinetics of the carburizing reactions within this injection stream.

It has been herein determined that it is not practical operationally to merely increase the number of nozzles on the periphery. The transition zone gases are introduced into the DR reactor through tuyeres penetrating the refractory wall of the reactor. These tuyeres are in contact with or exposed to thermal radiation from the burden itself which is about 700-860° C. The system is limited on how much total gas flow can be injected into the reactor by the requirement to maintain the majority of the thermal energy already present within the burden. Merely, increasing the number of nozzles on the periphery to increase contact area would necessitate one of two adjustments, neither of which is practical. The first is to increase the number of nozzles at the same size. This would create a significant drop in mass velocity within each nozzle thereby causing the nozzle to run hotter. Hotter nozzle tips result in premature activation of the carburizing reactions within the nozzle resulting in plugging of the nozzle. Secondly, increasing the number of nozzles and reducing their diameter to maintain adequate cooling velocity within the nozzle results in nozzle diameters that are too small and plug with metallized iron fines whenever the nozzles are not required to be in service and the reactor is in operation.

Thus, embodiments of the present invention advantageously improve upon prior methods and practices of carburizing DRI, especially in HDRI or HBI plants. The challenges as put forth previously are focused on the adequate use of the heat available within the transition zone, which is a nearly adiabatic system. Only the heat losses through the walls of the shaft furnace keep it from being entirely adiabatic and these heat losses are relatively insignificant as they fall into the <1% range of the thermal energy in the transition zone.

This previous practice, while beneficial, may only go so far in the optimization and utilization of the carburizing potential within the transition zone. Embodiments of the invention advantageously provide for even more carburizing potential by increasing the potential gas flows that can be handled within the transition zone, as well as increasing both gas-to-solid contact area at more elevated temperature and the gas chemistry profile for enhanced DRI carburization.

For example, and as further explained below, embodiments of the invention advantageously provide a lengthened/extended transition zone >about 0.5 m longer length of furnace below bustle; the transition zone, which typically ranges from 1.0 m-3.0 m in height will be increased by more than 0.5 m in height to provide the additional volume needed to support the multi-tiered gas injection system to enhance carburization. The CO-rich gas from the ACT unit is routed to at least two or three tiers of gas mixers. Thus, the afore-referenced Adjustable Carbon Technology (ACT), a process that creates a CO-rich stream and mixes it with, e.g., natural gas, is improved in part to employ multiple injection points into the extended transition zone, according to embodiments. The afore-referenced mixers are ratio controlled to provide a coordinated mixing ratio of the CO-rich gas and a hydrocarbon gas. Each tier has an optimized gas mixture ratio. The upper tier is more hydrocarbon rich since the temperature profile is hotter there and hydrocarbon cracking is promoted more in the higher temperature regime, about 800-850° ° C. The lower tier is a much more CO-rich gas mixture as the exothermic nature of the CO carburizing reactions make them more favored at the lower temperature regime, about 700-750° C. The center tier is optimized to a ratio more balanced between CO reactions and cracking reactions as it operates in a temperature zone between the other two, about 750-800° C. The tiered gas injection system with independent mixers allows for the profiled application of the gas chemistry to match the temperature profile.

Moreover, according to embodiments, each tier of gas injection is then made up of a full circumferential set of nozzles (optimally, 16-28 nozzles per tier) that penetrate through the shaft furnace wall to introduce the gas into the transition zone. Each ring of nozzles is located at the bottom of the segment of the transition zone that it serves. The countercurrent nature of the operation of the shaft furnace makes this the optimal location for each ring of nozzles for each tier of reactions. The nozzles on each ring are valved individually or via subheaders serving no more than 4 nozzles per header. This allows the gas injected at any level to be selectively introduced at a specified sector on the circumference of the transition zone or to the entire circumference if that is desired. Selectively adding the gases at specified sectors of the transition zone can provide additional temperature profile control for the reactions, as well as finer control of the discharge temperature from the transition zone to meet the operating target for the plant.

Thus, according to embodiments, a method for producing direct reduced iron using a unique and coordinated arrangement of CO-rich and hydrocarbon-rich gas streams with specified gas compositions and temperature profiles to produce the direct reduced iron with a carbon content of >4.5% wt. is realized. For example, according to embodiments, using an extended transition zone and a multi-tiered, carburizing gas injection system, the reaction conditions along the length of the transition zone can be controlled to optimize the carburizing reactions desired. Each of the tiers can have a circumferential, independently or subheader-valved nozzle arrangement to further optimize the contact area and temperature profile of the transition zone. Such methods and systems provides a three dimensional control scheme designed to provide flexibility in operation and optimization, according to embodiments.

Accordingly, an objective of embodiments of the invention to control the gas and temperature profile to enhance the carburization potential while not violating the minimum discharge temperature requirements inherent in the HDRI and HBI DR plants is advantageously achieved.

Figure 1:
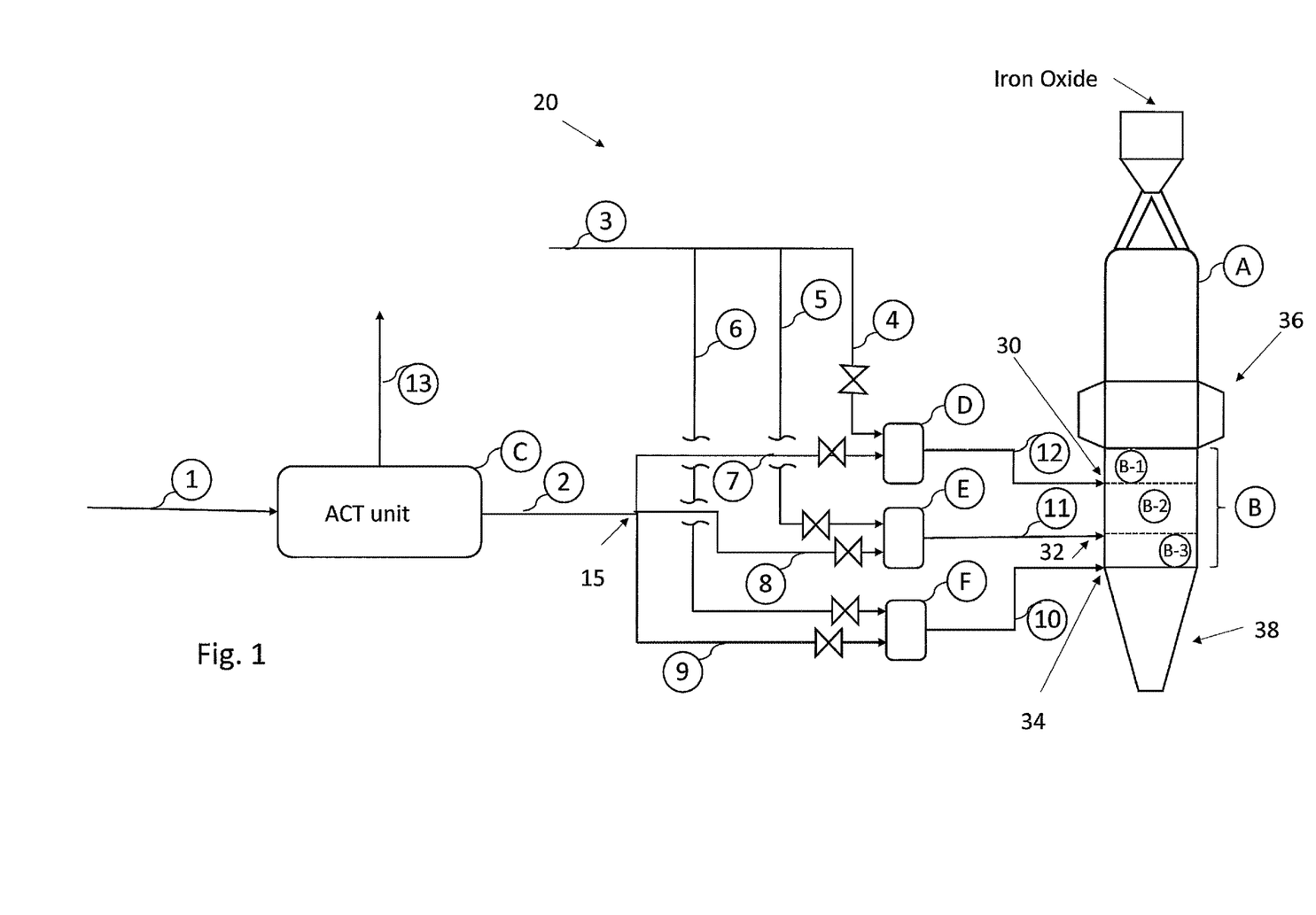
FIG. 1 is a schematic diagram illustrating one exemplary embodiment of the direct reduction (DR) process of the present invention for increasing the carbon content of the DRI, in which coordinated carburizing gas mixtures are introduced into the direct reduction shaft furnace in an extended transition zone region via a three mixer, three-tiered circumferential gas injection system.

Referring now specifically to FIG. 1, in one exemplary embodiment, the process 20 of the present invention includes the syngas or reformed gas stream 1 passing through an ACT unit C for the purpose of separating the CO from the rest of the syngas/reformed gas. It is noted that reformed gas stream 1 is derived from a reformer unit (not shown) of any design, such as a catalytic reformer (e.g., tubular reformer), a non-catalytic reformer (e.g., a partial oxidation reactor) or even a combination reformer (e.g., an auto-thermal reformer or a two-stage reformer), or any other reducing gas generating unit capable of producing a CO-containing gas with a relatively high $CO/CO_2$ ratio) to close to ambient temperature. An optional cooler/chiller (not shown) may also be employed, as further described below. Preferably, the reformed gas stream 1 contains at least 20.0 mol % CO.

As further shown in FIG. 1, the reformed gas stream 1 enters ACT unit C. As noted above, Adjustable Carbon Technology (ACT) geometry/processing is disclosed in afore-referenced U.S. Pat. No. 10,508,314, the contents of which are herein incorporated by reference, and embodiments of the invention improve upon this technology, as described herein. Accordingly, features of the ACT unit C will be briefly described below. In general, ACT unit C may employ the afore-referenced cooler/chiller. The cooler/chiller can utilize direct contact cooling, indirect contact cooling, refrigeration cooling, etc. During cooling, reformed gas can lose some of its water content, which in turn improves the carburization potential of the reformed gas. The cool/dry reformed gas optional flows through a compressor that can boost its pressure (to, e.g., 15 barg), as most separation/adsorption methods work best at higher pressures. During compression, the gas loses even more water, resulting in even further improved carburization potential. The compressed gas, after optional temperature adjustment, flows into a system of membrane modules for CO recovery. Any other kind of CO recovery unit/mechanism can also be employed, such as PSA/VPSA/TSA, refrigeration, etc.

The $H_2$-rich stream 13 (rejected gas from CO recovery unit of ACT unit C) can be sent back as, e.g., recycle to be used elsewhere in the process loop such as used in different portions of the DR plant as fuel, cooling gas, syngas, or process gas, or it can be exported to another facility.

The CO-rich stream 2 exiting ACT unit C passes to a junction 15 that splits the flow into a first CO-rich stream 7, a second CO-rich stream 8 and a third CO-rich stream 9 and enters three separate gas mixers, a first gas mixer D, a second gas mixer E and a third gas mixer F, respectively, as shown in FIG. 1, and further described below.

The high hydrocarbon gas (hydrocarbon-rich gas, e.g., natural gas) is introduced through hydrocarbon-rich gas stream 3 which is split into three independently controlled streams, a first hydrocarbon-rich gas stream 4, a second hydrocarbon-rich gas stream 5 and a third hydrocarbon-rich gas stream 6, going also into the gas mixers, D, E and F, respectively, as shown in FIG. 1.

It is further noted that, optionally, if the hydrocarbon-rich gas stream 3 is wet, one or more dehumidification units (not shown) can be used to make the gas dry for suppressing decarburization reactions. Optionally, if the hydrocarbon-rich stream 3 includes a significant amount of sulfur compounds, a desulfurization unit (not shown) can be used to decrease and control the amount of total sulfur to, e.g., below 100 ppm.

The first hydrocarbon-rich gas stream 4, second hydrocarbon-rich gas stream 5 and third hydrocarbon-rich gas stream 6 are blended with the first CO-rich stream 7, the second CO-rich stream 8 and the third CO-rich stream 9, respectively, before being introduced to the DR furnace A.

The resultant mixed carburizing gas streams, each with a coordinated composition based on the ratio control of the gas mixer steps, exit gas mixers D, E, and F as a first mixed carburizing gas stream 12, a second mixed carburizing gas stream 11 and a third mixed carburizing gas stream 10, respectively.

As further shown in FIG. 1, the first mixed carburizing gas stream 12, second mixed carburizing gas stream 11 and third mixed carburizing gas stream 10 are then introduced into transition zone B of furnace A through a circumferential set of nozzles located at the bottom of each tier of the transition zone B comprising, a first tier, a second tier and a third tier, tiers B-1, B-2 and B-3, respectively, as shown in FIG. 1. The nozzles are each individually valved or valved in a subheader arrangement grouping preferably no more than 4 nozzles on each subheader. This provides the chemistry and thermal profile control that enables the carburizing potential of the transition zone B to be increased from maximum of 3.5 wt % carbon in the DRI with conventional ACT teachings to >4.5 wt. % carbon in the DRI. More particularly, according to embodiments, each tier of gas injection is made up of a full circumferential set (ring) of nozzles 30, 32, 34, respectively (optimally, 16-28 nozzles per tier) that penetrate through the shaft furnace wall to introduce the gas into the transition zone B. Each ring of nozzles 30, 32, 34 is located at the bottom of the segment of the transition zone B that it serves. The countercurrent nature of the operation of the shaft furnace A makes this the optimal location for each ring of nozzles 30, 32, 34 for each tier of reactions. The nozzles on each ring are valved individually or via subheaders serving no more than 4 nozzles per header. This allows the gas injected at any level to be selectively introduced at a specified sector on the circumference of the transition zone B or to the entire circumference if that is desired. Selectively adding the gases at specified sectors of the transition zone B can provide additional temperature profile control for the reactions, as well as finer control of the discharge temperature from the transition zone B to meet the operating target for the plant.

Figure 2:
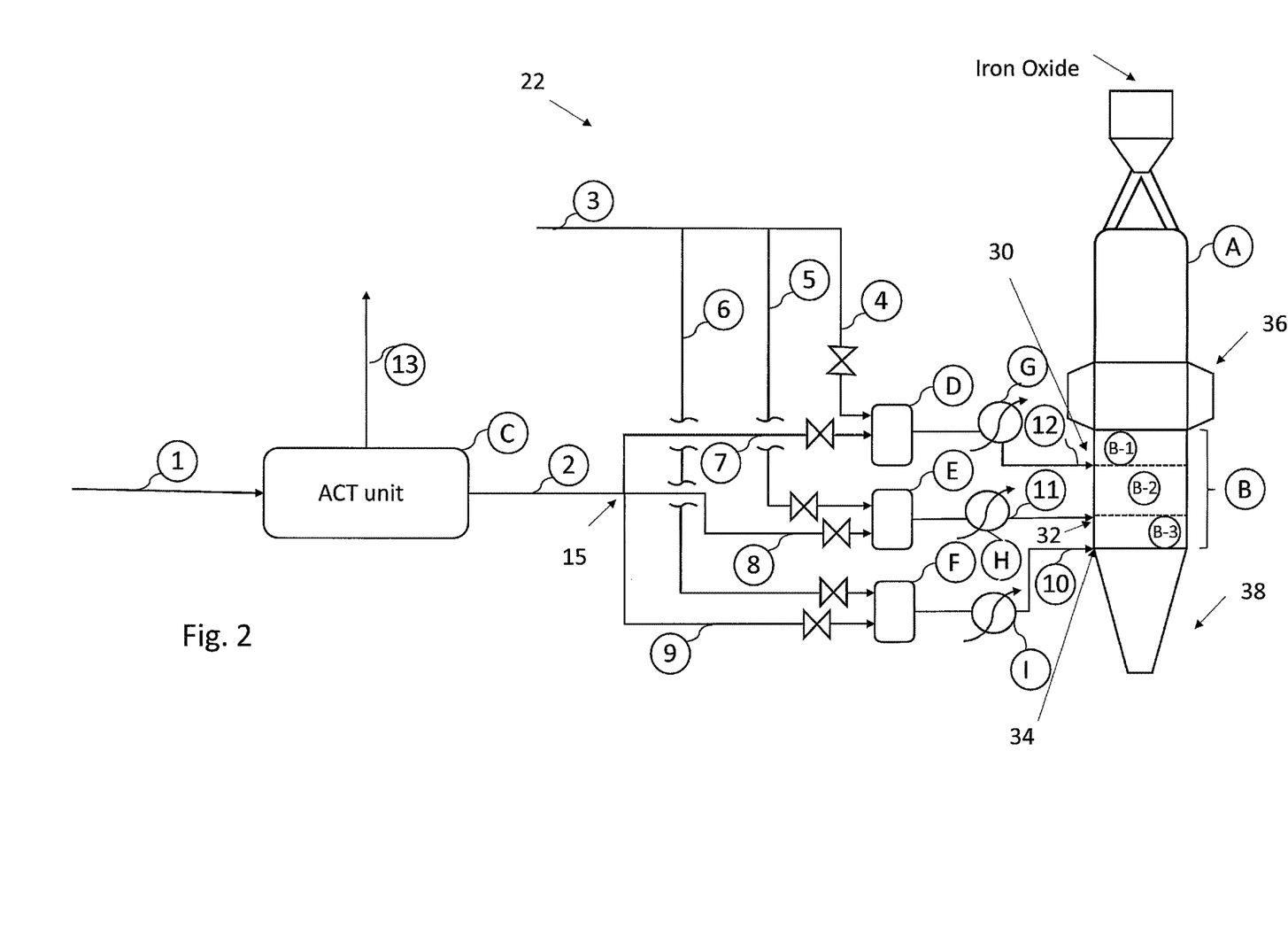
FIG. 2 is a schematic diagram illustrating another exemplary embodiment of the direct reduction (DR) process of the present invention for increasing the carbon content of the DRI, in which coordinated carburizing gas mixtures are introduced into the direct reduction shaft furnace in an extended transition zone region via a three mixer, three preheater, three-tiered circumferential gas injection system.

Referring now to FIG. 2, in another exemplary embodiment the process 22 of the present invention includes the syngas or reformed gas stream 1 passing through an ACT unit C for the purpose of separating the CO from the rest of the syngas/reformed gas. It is noted that reformed gas stream 1 is derived from a reformer unit (not shown) of any design, such as a catalytic reformer (e.g., tubular reformer), a non-catalytic reformer (e.g., a partial oxidation reactor) or even a combination reformer (e.g., an auto-thermal reformer or a two-stage reformer), or any other reducing gas generating unit capable of producing a CO-containing gas with a relatively high $CO/CO_2$ ratio) to close to ambient temperature. An optional cooler/chiller (not shown) may also be employed, as further described below. Preferably, the reformed gas stream 1 contains at least 20.0 mol % CO.

As further shown in FIG. 2, the reformed gas stream 1 enters ACT unit C. As noted above, Adjustable Carbon Technology (ACT) geometry/processing is disclosed in afore-referenced U.S. Pat. No. 10,508,314, and embodiments of the invention improve upon this technology, as described herein. Accordingly, features of the ACT unit C will be briefly described below. In general, ACT unit C may employ the afore-referenced cooler/chiller. The cooler/chiller can utilize direct contact cooling, indirect contact cooling, refrigeration cooling, etc. During cooling, reformed gas can lose some of its water content, which in turn improves the carburization potential of the reformed gas. The cool/dry reformed gas optional flows through a compressor that can boost its pressure (to, e.g., 15 barg), as most separation/adsorption methods work best at higher pressures. During compression, the gas loses even more water, resulting in even further improved carburization potential. The compressed gas, after optional temperature adjustment, flows into a system of membrane modules for CO recovery. Any other kind of CO recovery unit/mechanism can also be employed, such as PSA/VPSA/TSA, refrigeration, etc.

The $H_2$-rich stream 13 (rejected gas from CO recovery unit of ACT unit C) can be sent back as, e.g., recycle to be used elsewhere in the process loop such as used in different portions of the DR plant as fuel, cooling gas, syngas, or process gas, or it can be exported to another facility.

The CO-rich stream 2 exiting ACT unit C passes to a junction 15 that splits the flow into a first CO-rich stream 7, a second CO-rich stream 8 and a third CO-rich stream 9 and enters three separate gas mixers, a first gas mixer D, a second gas mixer E and a third gas mixer F, respectively, as shown in FIG. 2, and further described below.

The high hydrocarbon gas (hydrocarbon-rich gas, e.g., natural gas) is introduced through hydrocarbon-rich gas stream 3 which is split into three independently controlled streams, a first hydrocarbon-rich gas stream 4, a second hydrocarbon-rich gas stream 5 and a third hydrocarbon-rich gas stream 6, going also into the gas mixers, D, E and F, respectively, as shown in FIG. 2.

It is further noted that, optionally, if the hydrocarbon-rich gas stream 3 is wet, one or more dehumidification units (not shown) can be used to make the gas dry for suppressing decarburization reactions. Optionally, if the hydrocarbon-rich stream 3 includes a significant amount of sulfur compounds, a desulfurization unit (not shown) can be used to decrease and control the amount of total sulfur to, e.g., below 100 ppm.

The first hydrocarbon-rich gas stream 4, second hydrocarbon-rich gas stream 5 and third hydrocarbon-rich gas stream 6 are blended with the first CO-rich stream 7, the second CO-rich stream 8 and the third CO-rich stream 9, respectively, before being introduced to the DR furnace A.

The resultant mixed carburizing gas streams, each with a coordinated composition based on the ratio control of the gas mixer steps, exit gas mixers D, E, and F as a first mixed carburizing gas stream 12, a second mixed carburizing gas stream 11 and a third mixed carburizing gas stream 10, respectively.

As further shown in FIG. 2, the first mixed carburizing gas stream 12, second mixed carburizing gas stream 11 and third mixed carburizing gas stream 10 are then introduced into transition zone B of furnace A through a circumferential set of nozzles located at the bottom of each tier of the transition zone B comprising, a first tier, a second tier and a third tier, tiers B-1, B-2 and B-3, respectively, as shown in FIG. 2. The nozzles are each individually valved or valved in a subheader arrangement grouping preferably no more than 4 nozzles on each subheader. This provides the chemistry and thermal profile control that enables the carburizing potential of the transition zone B to be increased from maximum of 3.5 wt % carbon in the DRI with conventional ACT teachings to >4.5 wt. % carbon in the DRI. More particularly, according to embodiments, each tier of gas injection is made up of a full circumferential set (ring) of nozzles 30, 32, 34, respectively (optimally, 16-28 nozzles per tier) that penetrate through the shaft furnace wall to introduce the gas into the transition zone B. Each ring of nozzles 30, 32, 34 is located at the bottom of the segment of the transition zone B that it serves. The countercurrent nature of the operation of the shaft furnace A makes this the optimal location for each ring of nozzles 30, 32, 34 for each tier of reactions. The nozzles on each ring are valved individually or via subheaders serving no more than 4 nozzles per header. This allows the gas injected at any level to be selectively introduced at a specified sector on the circumference of the transition zone B or to the entire circumference if that is desired. Selectively adding the gases at specified sectors of the transition zone B can provide additional temperature profile control for the reactions, as well as finer control of the discharge temperature from the transition zone B to meet the operating target for the plant.

Advantageously, in this exemplary embodiment and as further shown in FIG. 2, the temperature profile control for the transition zone B is enhanced further by passing each of the carburizing gas mixtures, i.e., the first mixed carburizing gas stream 12, second mixed carburizing gas stream 11 and third mixed carburizing gas stream 10 through independently controlled preheaters, e.g., a first preheater G, a second preheater H and a third preheater I, respectively, as shown in FIG. 2 to preheat to suitable and desired temperatures as needed. This provides the flexibility of adding the suitable temperature gas to the appropriate tier within the carburizing gas injection system.

Figure 3:
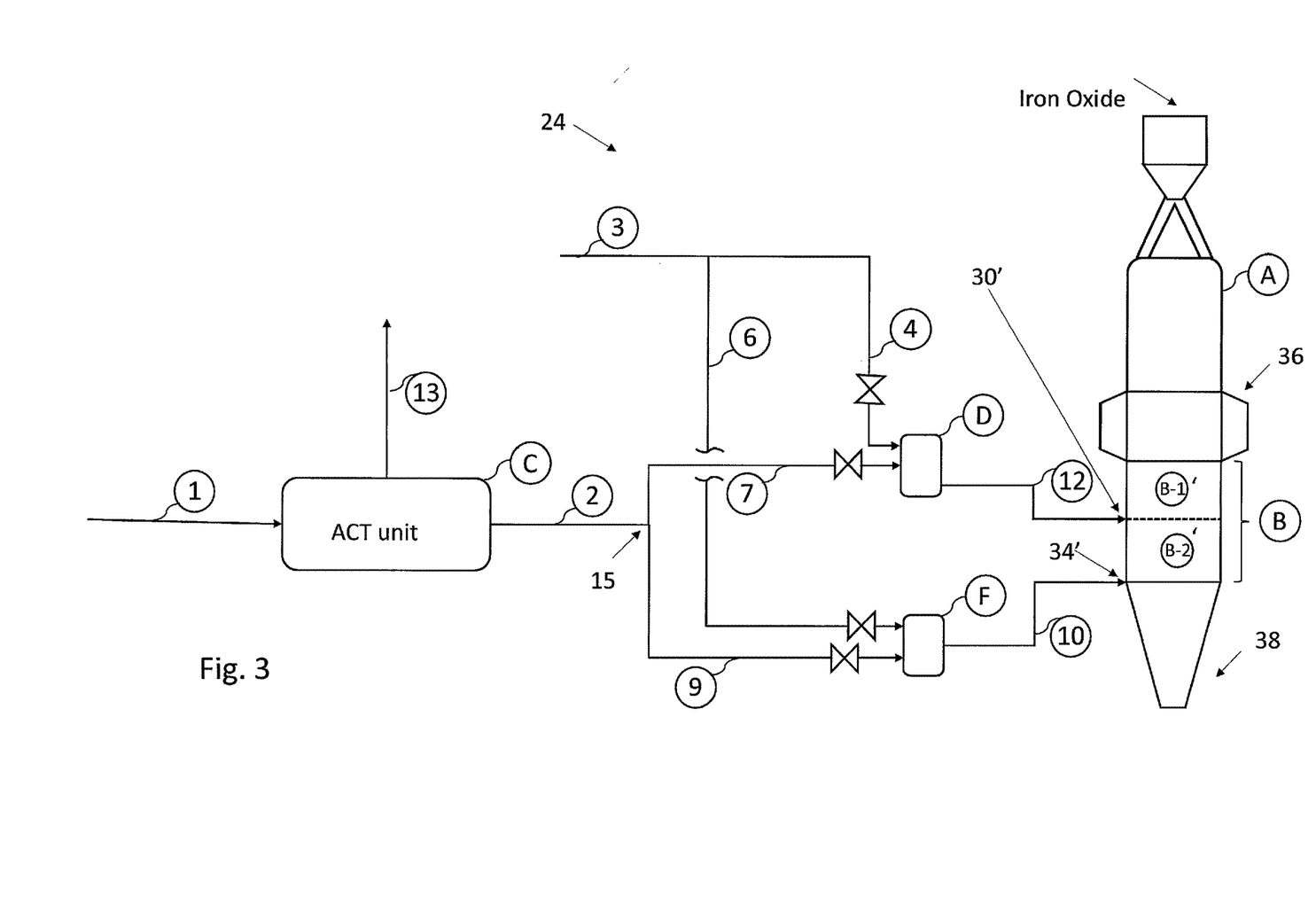
FIG. 3 is a schematic diagram illustrating a further exemplary embodiment of the direct reduction (DR) process of the present invention for increasing the carbon content of the DRI, in which coordinated carburizing gas mixtures are introduced into the direct reduction shaft furnace in an extended transition zone region via a two mixer, two-tiered circumferential gas injection system.

Referring now to FIG. 3, in a further exemplary embodiment, the process 24 of the present invention includes the syngas or reformed gas stream 1 passing through an ACT unit C for the purpose of separating the CO from the rest of the syngas/reformed gas. It is noted that reformed gas stream 1 is derived from a reformer unit (not shown) of any design, such as a catalytic reformer (e.g., tubular reformer), a non-catalytic reformer (e.g., a partial oxidation reactor) or even a combination reformer (e.g., an auto-thermal reformer or a two-stage reformer), or any other reducing gas generating unit capable of producing a CO-containing gas with a relatively high $CO/CO_2$ ratio) to close to ambient temperature. An optional cooler/chiller (not shown) may also be employed, as further described below. Preferably, the reformed gas stream 1 contains at least 20.0 mol % CO.

As further shown in FIG. 3, the reformed gas stream 1 enters ACT unit C. As noted above, Adjustable Carbon Technology (ACT) geometry/processing is disclosed in afore-referenced U.S. Pat. No. 10,508,314, and embodiments of the invention improve upon this technology, as described herein. Accordingly, features of the ACT unit C will be briefly described below. In general, ACT unit C may employ the afore-referenced cooler/chiller. The cooler/chiller can utilize direct contact cooling, indirect contact cooling, refrigeration cooling, etc. During cooling, reformed gas can lose some of its water content, which in turn improves the carburization potential of the reformed gas. The cool/dry reformed gas optional flows through a compressor that can boost its pressure (to, e.g., 15 barg), as most separation/adsorption methods work best at higher pressures. During compression, the gas loses even more water, resulting in even further improved carburization potential. The compressed gas, after optional temperature adjustment, flows into a system of membrane modules for CO recovery. Any other kind of CO recovery unit/mechanism can also be employed, such as PSA/VPSA/TSA, refrigeration, etc.

The $H_2$-rich stream 13 (rejected gas from CO recovery unit of ACT unit C) can be sent back as, e.g., recycle to be used elsewhere in the process loop such as used in different portions of the DR plant as fuel, cooling gas, syngas, or process gas, or it can be exported to another facility.

The CO-rich stream 2 exiting ACT unit C passes to a junction 15 that splits the flow into first CO-rich stream 7 and third CO-rich stream 9 and enters two separate gas mixers, first gas mixer D and third gas mixer F, respectively, as shown in FIG. 3, and further described below.

The high hydrocarbon gas (hydrocarbon-rich gas, e.g., natural gas) is introduced through hydrocarbon-rich gas stream 3 which is split into two independently controlled streams, first hydrocarbon-rich gas stream 4 and third hydrocarbon-rich gas stream 6, going also into the gas mixers, D and F, respectively, as shown in FIG. 3.

It is further noted that, optionally, if the hydrocarbon-rich gas stream 3 is wet, one or more dehumidification units (not shown) can be used to make the gas dry for suppressing decarburization reactions. Optionally, if the hydrocarbon-rich stream 3 includes a significant amount of sulfur compounds, a desulfurization unit (not shown) can be used to decrease and control the amount of total sulfur to, e.g., below 100 ppm.

The first hydrocarbon-rich gas stream 4 and third hydrocarbon-rich gas stream 6 are blended with the first CO-rich stream 7 and third CO-rich stream 9, respectively, before being introduced to the DR furnace A.

The resultant mixed carburizing gas streams, each with a coordinated composition based on the ratio control of the gas mixer steps, exit gas mixers D and F as a first mixed carburizing gas stream 12 and third mixed carburizing gas stream 10, respectively.

As further shown in FIG. 3, the first mixed carburizing gas stream 12 and third mixed carburizing gas stream 10 are then introduced into transition zone B of furnace A through a circumferential set of nozzles located at the bottom of each tier of the transition zone B comprising two tiers, tiers B-1' and B-2', respectively, as shown in FIG. 3. The nozzles are each individually valved or valved in a subheader arrangement grouping preferably no more than 4 nozzles on each subheader. This provides the chemistry and thermal profile control that enables the carburizing potential of the transition zone B to be increased from maximum of 3.5 wt % carbon in the DRI with conventional ACT teachings to >4.5 wt. % carbon in the DRI. More particularly, according to embodiments, each tier of gas injection is made up of a full circumferential set (ring) of nozzles 30', 34', respectively (optimally, 16-28 nozzles per tier) that penetrate through the shaft furnace wall to introduce the gas into the transition zone B. Each ring of nozzles 30', 34' is located at the bottom of the segment of the transition zone B that it serves. The countercurrent nature of the operation of the shaft furnace A makes this the optimal location for each ring of nozzles 30', 34' for each tier of reactions. The nozzles on each ring are valved individually or via subheaders serving no more than 4 nozzles per header. This allows the gas injected at any level to be selectively introduced at a specified sector on the circumference of the transition zone B or to the entire circumference if that is desired. Selectively adding the gases at specified sectors of the transition zone B can provide additional temperature profile control for the reactions, as well as finer control of the discharge temperature from the transition zone B to meet the operating target for the plant.

Figure 4:
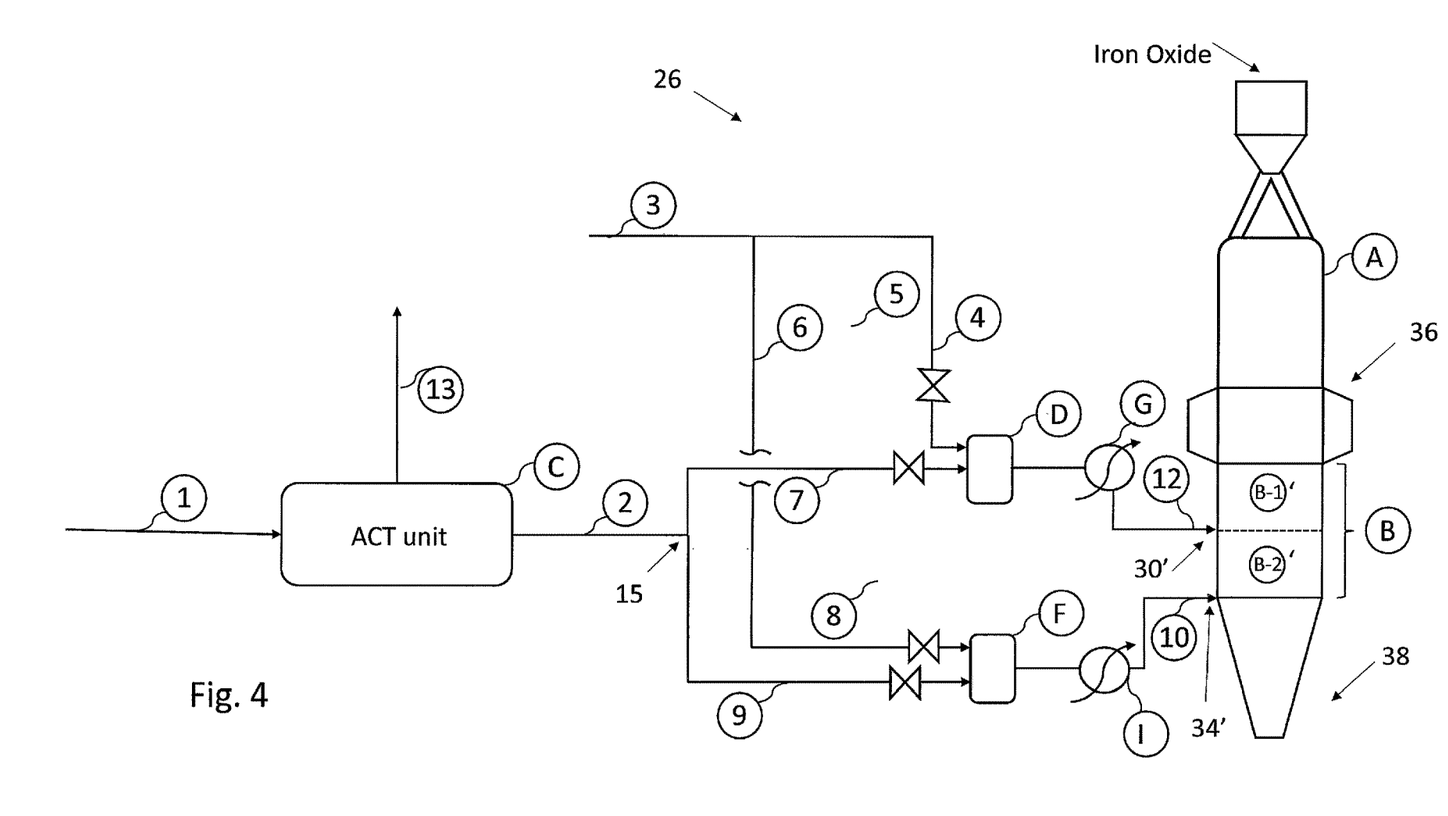
FIG. 4 is a schematic diagram illustrating another exemplary embodiment of the direct reduction (DR) process of the present invention for increasing the carbon content of the DRI, in which coordinated carburizing gas mixtures are introduced into the direct reduction shaft furnace in an extended transition zone region via a two mixer, two preheater, two-tiered circumferential gas injection system.

Referring now to FIG. 4, in a still further exemplary embodiment, the process 26 of the present invention includes the syngas or reformed gas stream 1 passing through an ACT unit C for the purpose of separating the CO from the rest of the syngas/reformed gas. It is noted that reformed gas stream 1 is derived from a reformer unit (not shown) of any design, such as a catalytic reformer (e.g., tubular reformer), a non-catalytic reformer (e.g., a partial oxidation reactor) or even a combination reformer (e.g., an auto-thermal reformer or a two-stage reformer), or any other reducing gas generating unit capable of producing a CO-containing gas with a relatively high $CO/CO_2$ ratio) to close to ambient temperature. An optional cooler/chiller (not shown) may also be employed, as further described below. Preferably, the reformed gas stream 1 contains at least 20.0 mol % CO.

As further shown in FIG. 4, the reformed gas stream 1 enters ACT unit C. As noted above, Adjustable Carbon Technology (ACT) geometry/processing is disclosed in afore-referenced U.S. Pat. No. 10,508,314, and embodiments of the invention improve upon this technology, as described herein. Accordingly, features of the ACT unit C will be briefly described below. In general, ACT unit C may employ the afore-referenced cooler/chiller. The cooler/chiller can utilize direct contact cooling, indirect contact cooling, refrigeration cooling, etc. During cooling, reformed gas can lose some of its water content, which in turn improves the carburization potential of the reformed gas. The cool/dry reformed gas optional flows through a compressor that can boost its pressure (to, e.g., 15 barg), as most separation/adsorption methods work best at higher pressures. During compression, the gas loses even more water, resulting in even further improved carburization potential. The compressed gas, after optional temperature adjustment, flows into a system of membrane modules for CO recovery. Any other kind of CO recovery unit/mechanism can also be employed, such as PSA/VPSA/TSA, refrigeration, etc.

The $H_2$-rich stream 13 (rejected gas from CO recovery unit of ACT unit C) can be sent back as, e.g., recycle to be used elsewhere in the process loop such as used in different portions of the DR plant as fuel, cooling gas, syngas, or process gas, or it can be exported to another facility.

The CO-rich stream 2 exiting ACT unit C passes to a junction 15 that splits the flow into first CO-rich stream 7 and third CO-rich stream 9 and enters two separate gas mixers, first gas mixer D and third gas mixer F, respectively, as shown in FIG. 4, and further described below.

The high hydrocarbon gas (hydrocarbon-rich gas, e.g., natural gas) is introduced through hydrocarbon-rich gas stream 3 which is split into two independently controlled streams, first hydrocarbon-rich gas stream 4 and third hydrocarbon-rich gas stream 6, going also into the gas mixers, D and F, respectively, as shown in FIG. 4.

It is further noted that, optionally, if the hydrocarbon-rich gas stream 3 is wet, one or more dehumidification units (not shown) can be used to make the gas dry for suppressing decarburization reactions. Optionally, if the hydrocarbon-rich stream 3 includes a significant amount of sulfur compounds, a desulfurization unit (not shown) can be used to decrease and control the amount of total sulfur to, e.g., below 100 ppm.

The first hydrocarbon-rich gas stream 4 and third hydrocarbon-rich gas stream 6 are blended with the first CO-rich stream 7 and third CO-rich stream 9, respectively, before being introduced to the DR furnace A.

The resultant mixed carburizing gas streams, each with a coordinated composition based on the ratio control of the gas mixer steps, exit gas mixers D and F as a first mixed carburizing gas stream 12 and third mixed carburizing gas stream 10, respectively.

As further shown in FIG. 4, the first mixed carburizing gas stream 12 and third mixed carburizing gas stream 10 are then introduced into transition zone B of furnace A through a circumferential set (ring) of nozzles located at the bottom of each tier of the transition zone B comprising two tiers, tiers B-1' and B-2', respectively, as shown in FIG. 4. The nozzles are each individually valved or valved in a subheader arrangement grouping preferably no more than 4 nozzles on each subheader. This provides the chemistry and thermal profile control that enables the carburizing potential of the transition zone B to be increased from maximum of 3.5 wt % carbon in the DRI with conventional ACT teachings to >4.5 wt. % carbon in the DRI. More particularly, according to embodiments, each tier of gas injection is made up of a full circumferential set of nozzles 30', 34', respectively (optimally, 16-28 nozzles per tier) that penetrate through the shaft furnace wall to introduce the gas into the transition zone B. Each ring of nozzles 30', 34' is located at the bottom of the segment of the transition zone B that it serves. The countercurrent nature of the operation of the shaft furnace A makes this the optimal location for each ring of nozzles 30', 34' for each tier of reactions. The nozzles on each ring are valved individually or via subheaders serving no more than 4 nozzles per header. This allows the gas injected at any level to be selectively introduced at a specified sector on the circumference of the transition zone B or to the entire circumference if that is desired. Selectively adding the gases at specified sectors of the transition zone B can provide additional temperature profile control for the reactions, as well as finer control of the discharge temperature from the transition zone B to meet the operating target for the plant.

Advantageously, in this exemplary embodiment and as further shown in FIG. 4, the temperature profile control for the transition zone B is enhanced further by passing each of the carburizing gas mixtures, i.e., the first mixed carburizing gas stream 12 and the third mixed carburizing gas stream 10 through independently controlled preheaters, e.g., first preheater G and third preheater I, respectively, as shown in FIG. 4 to preheat to suitable and desired temperatures as needed. This provides the flexibility of adding the suitable temperature gas to the appropriate tier within the carburizing gas injection system.

Advantageously, as shown in each of FIGS. 1-4, iron oxide enters the top of furnace A. Partially or completed reduced iron oxide may thus be exposed to the afore-described CO-rich and hydrocarbon-rich streams, according to embodiments.

As further advantageously shown in each of FIGS. 1-4, primary reduction zone/bustle area 36, where most reduction takes place, is shown in furnace A above transition zone B. Transition zone B extends from the bottom of the primary reduction zone/bustle area 36 to the top of the cooling zone 38 including tiers stacked vertically, as further shown in FIGS. 1-4, and is where the mixed gases and received and further reduction takes place. Transition zone B advantageously forms an extended transition zone (extended length below the bustle area) in the furnace, as further explained above. It is noted that no mixed gases are received in cooling zone 38, according to embodiments. It is further noted that, in general, the partially or completely reduced iron oxide in the transition zone B and/or the cooling zone 38 contains 0.0 wt. % to 3.0 wt. % combined carbon before, however, employing the afore-described vertically stacked, multiple tiered transition zone B, as shown in FIGS. 1-4, carbon content in the resultant DRI of greater than about 4.5 wt. % can advantageously achieved.

Although the present invention is illustrated and described herein with reference to particular and preferred embodiments, and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims. Moreover, all features, elements and embodiments described herein may be used in any combinations.

What is claimed is:

1. A direct reduced shaft furnace comprising:
   a reduction zone;
   a transition zone separate and after the reduction zone, wherein the transition zone has multiple vertically stacked tiers, and each tier is configured to receive a separate flow of a mixed carburized gas stream, wherein the mixed carburized gas stream comprises a mixture of a carbon monoxide-rich gas stream and a hydrocarbon-rich gas stream; and
   a cooling zone located below the transition zone, wherein the direct reduced shaft furnace is configured to expose reduced iron partially or completely to each of the mixed carburizing gas streams and increase the carbon content of resulting direct reduced iron of the direct reduced shaft furnace to greater than about 4.5 wt. %.

2. The direct reduced shaft furnace of claim 1, wherein the transition zone comprises a plurality of tiers of equal height within the transition zone and each tier comprises an arrangement of nozzles, and wherein the furnace is configured to receive each of the mixed carburizing gas streams in a separate tier of the transition zone via the arrangement of nozzles at each tier.

3. The direct reduced shaft furnace of claim 2, wherein the nozzles at each tier are configured in a circumferential ring of equal number of nozzles located at the bottom of each tier.

4. The direct reduced shaft furnace of claim 3, wherein the circumferential ring comprises between about 16 to 28 nozzles.

5. The direct reduced shaft furnace of claim 4, wherein the nozzles are individually-valved or header-valved with no more than 4 nozzles per header.

6. The direct reduced shaft furnace of claim 1, wherein the furnace is configured to receive each of the mixed carburizing gas streams introduced into a separate tier of the transition zone in varied in composition.

7. The direct reduced furnace of claim 1, wherein each tier comprises a different mixed carburized gas stream composition.

8. The direct reduced furnace of claim 6, wherein the transition zone is increased in total height by >0.5 m to a height between 1.5 m-3.5 m.

\* \* \* \* \*